US006928623B1

(12) United States Patent
Sibert (10) Patent No.: US 6,928,623 B1
(45) Date of Patent: Aug. 9, 2005

(54) METHOD AND SYSTEM FOR SELECTING A TARGET WINDOW FOR AUTOMATIC FILL-IN

(75) Inventor: Mark A. Sibert, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 689 days.

(21) Appl. No.: 09/475,941

(22) Filed: Dec. 30, 1999

(51) Int. Cl.$^7$ .............................................. G09G 5/00
(52) U.S. Cl. ................... 715/783; 715/796; 715/802
(58) Field of Search ................................. 345/739, 769, 345/783, 796, 711, 712, 802; 707/507, 901; 709/328; 705/26, 27, 70; 715/739, 769, 783, 796, 802, 804, 780

(56) References Cited

U.S. PATENT DOCUMENTS

| | | | | |
|---|---|---|---|---|
| 5,592,378 A | | 1/1997 | Cameron et al. | 395/227 |
| 5,754,176 A | * | 5/1998 | Crawford | 345/711 |
| 5,841,420 A | | 11/1998 | Kaply et al. | 345/118 |
| 5,893,110 A | | 4/1999 | Weber et al. | 707/104 |

OTHER PUBLICATIONS

ECML Electronic Commerce Modeling Language, http://www.ecml.org/spec.htm.
Nick Wingfield, Navigator will carry digital wallet, CNET News.com, http://news.cnet.com/news, May 13, 1996.
IBM Consumer Wallet, Support, http://www—4.ibm.com/software/commerce/payment/support/wallet/index.html.
IBM Consumer Wallet, FAQS, http://www—4.ibm.com/software/commerce/payment/support/wallet/wques.html.

* cited by examiner

Primary Examiner—Kristine Kincaid
Assistant Examiner—Thanh Vu
(74) Attorney, Agent, or Firm—Synnestvedt & Lechner LLP; Gregory M. Doudnikoff (57) ABSTRACT

An improved data processing system in which a user of a GUI can easily designate one of a plurality of windows to be automatically filled in with predetermined, pre-stored information. A method and system are disclosed for selection of a target window from among a plurality of open windows so that the target window can be used for an application specific function, such as for the directing of digital wallet information to the target window only.

6 Claims, 9 Drawing Sheets

METHOD AND SYSTEM FOR SELECTING A TARGET WINDOW FOR AUTOMATIC FILL-IN

FIELD OF INVENTION

The present invention relates in general to an improved data processing system, and in particular to a method and system for displaying information in a data processing system. More particularly, the present invention relates to a method and system for displaying information in windows in a graphical user interface.

BACKGROUND OF THE INVENTION

A graphical user interface (GUI) is a type of display format that enables a data processing system user to choose commands, start programs, and see graphical and textual information generated by applications by pointing to pictorial representations (icons) and lists of menu items on the screen. Examples of such graphical user interfaces include the graphical user interface sold under the trademark "WINDOWS" by Microsoft Corporation and the graphical user interface sold under the trademark "OS/2 Warp" by International Business Machines Corporation (IBM).

For application developers, graphical user interfaces offer a programming environment that manages the direct interaction between the computer and computer user. This permits the developer to concentrate on application programming without devoting a large percentage of effort to the details of screen display or mouse and keyboard inputs. A GUI also enables programmers to create programs that handle frequently performed tasks, such as displaying textual or graphical information in a window, in the same way because the interface provides standard controlling mechanisms such as the generation of windows and dialog boxes. Another benefit is that applications written for a graphical user interface are device-independent—as the interface changes to support new input or output devices, such as a large-screen monitor, the applications can, without modification, use such new devices.

It is well known to use "windows" in implementing a graphical user interface. A window is a portion of the screen that can contain its own document or message. Windows may be used to display various types of information and other objects, such as textual information, graphical information, and application tools such as icons, buttons, status windows, and the like. Different windows may receive output from different applications running concurrently, and a single application may generate output displayed in several windows. Each window might also contain its own menu or other controls, and the computer user might be able to enlarge and shrink individual windows at will. Typically, windows act independently, as if each window were a virtual display device.

In general, windows may be displayed as tiled, or overlapped. Tiled windows are displayed side-by-side horizontally or vertically or both, with no overlap of their displayed regions. Overlapped windows appear to be stacked one or top of another, like individual pieces of paper piled on a desktop, with the covered portions of lower windows not being displayed. This type of display is sometimes referred to as "the desktop metaphor for displays," or "messy desk windowing." It is currently popular in data processing systems to support such messy desk windowing.

The Internet and the World Wide Web has provided a vehicle for the explosive growth of electronic commerce. Utilizing specialized GUIs called web browsers, consumers can access the website of a retailer, browse through an electronic catalog and select items for purchase. The user will input information such as catalog numbers, sizes, color selections, etc. as well as personal information such as credit card number(s), mailing address information, billing address information and the like. Generally such information is input using one or more forms that appear as windows on the user's computer screen.

In early prior art systems, each time a user entered a website and/or ordered information or materials electronically, the user was required to manually input the information needed to complete the forms. Much of the information, e.g., the personal information regarding the purchaser, had to be reentered each time. Accordingly, "digital wallets" were developed. An example of a digital wallet is "Consumer Wallet" produced by International Business Machines Corporation. A digital wallet is an application or service that assists consumers in conducting online transactions by allowing them to store billing, shipping, and payment information; and to use this information to automatically complete a merchant's check-out page, typically by "dragging" the desired information to the appropriate location. Digital wallets have been successfully built into browsers, as helper applications to browsers, as stand-alone client applications, and as server-based applications. However, due to the lack of standards which would allow the information from the digital wallet to be automatically transferred to the appropriate fields on the check-out page, the use of digital wallets has experienced slow growth.

Recently, however, in an effort to increase the usability of digital wallets, a group of companies, including IBM, American Express, America Online, Compaq, CyberCash, Microsoft, and others have collaborated to develop a universal format for digital wallets in merchant websites. This format is called Electronic Commerce Modeling Language, or ECML.

ECML uses a set of uniform field names which assure that information contained in the digital wallet is associated with the correct field on the merchant's form. Using ECML, web sites are being developed which allow an "automatic form fill-in" feature residing in the digital wallet to allow point-and-click completion of a form window.

While this automatic form fill-in feature works well when a single window containing a form is open in the browser, it is not uncommon for multiple windows to be open simultaneously (e.g., windows displaying multiple items to be purchased, multiple order form windows from different vendors, etc.). In such situations, the automatic fill features will attempt to fill all of the windows that are open, or will only try to fill the first window it "finds," which may not be the window desired by the user. This can cause several problems, including the incorrect entry of data into forms and the generation of numerous error codes indicating the incompatibility of the window with the information that the program is attempting to enter into the window. This is time-consuming and annoying to the user and could result in, among other things, sensitive user information (e.g. credit card numbers) being sent to the wrong site, or the user abandoning the attempted purchase, resulting in loss of a potential sale by the merchant.

Accordingly, a need exists for a technique which allows the selection of a target window from among a plurality of open windows so that the target window can be used for an application-specific function, such as for directing digital wallet information to the target window only.

SUMMARY OF THE INVENTION

An object of the present invention is to provide an improved data processing system in which a user of a GUI can easily designate one of a plurality of windows to be automatically filled in with predetermined, pre-stored information.

It is another object of the present invention to provide a method and system for selectio of a target window from among a plurality of open windows so that the target window can be used for an application specific function, such as for the directing of digital wallet information to the target window only.

Other objects and advantages of the present invention will be set forth in the description and the drawings which follow, and, in part, will be obvious from the description or may be learned by practice of the invention.

To achieve the foregoing objects, and in accordance with the purpose of the invention as broadly described herein, the present invention provides a computer-implemented method of automatically inserting data into at least one window displayed in a graphical user interface (GUI) in a desktop configuration, comprising the steps of: providing a list of selectable elements, each of the selectable elements in the list associated with a respective window presently opened in the GUI; designating one of the opened windows as a target window by selecting one of the selectable elements in the list; automatically moving the target window to the top of the desktop when the target window is designated; and automatically inserting the data into the target window.

The present invention will now be described with reference to the following drawings, in which like reference numbers denote the same element throughout.

DETAILED DESCRIPTION OF THE PREFERRED EMBODIMENT.

Figure 1:
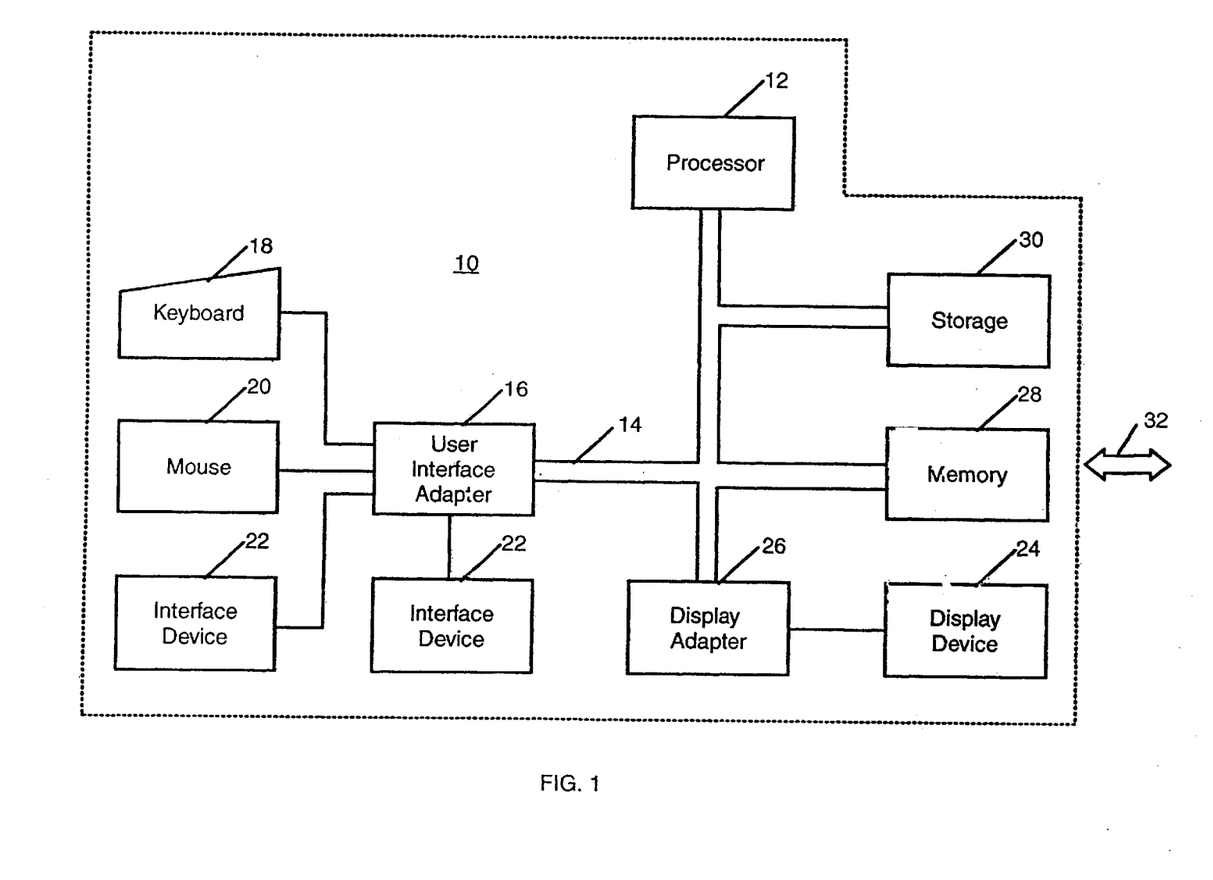
FIG. 1 is a pictorial representation of a data processing system which may be utilized to implement the present invention.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long term storage 30 which can include a hard drive, tape drive, etc.

The workstation 10 communicates via a communications channel 32 with other computers or networks of computers. The workstation 10 may be associated with such other computers in a local area network (LAN) or a wide area network, or the workstation 10 can be client in a client/server arrangement with another computer, etc. All of these configurations, as well as the appropriate communications hardware and software, are known in the art.

Figure 2:
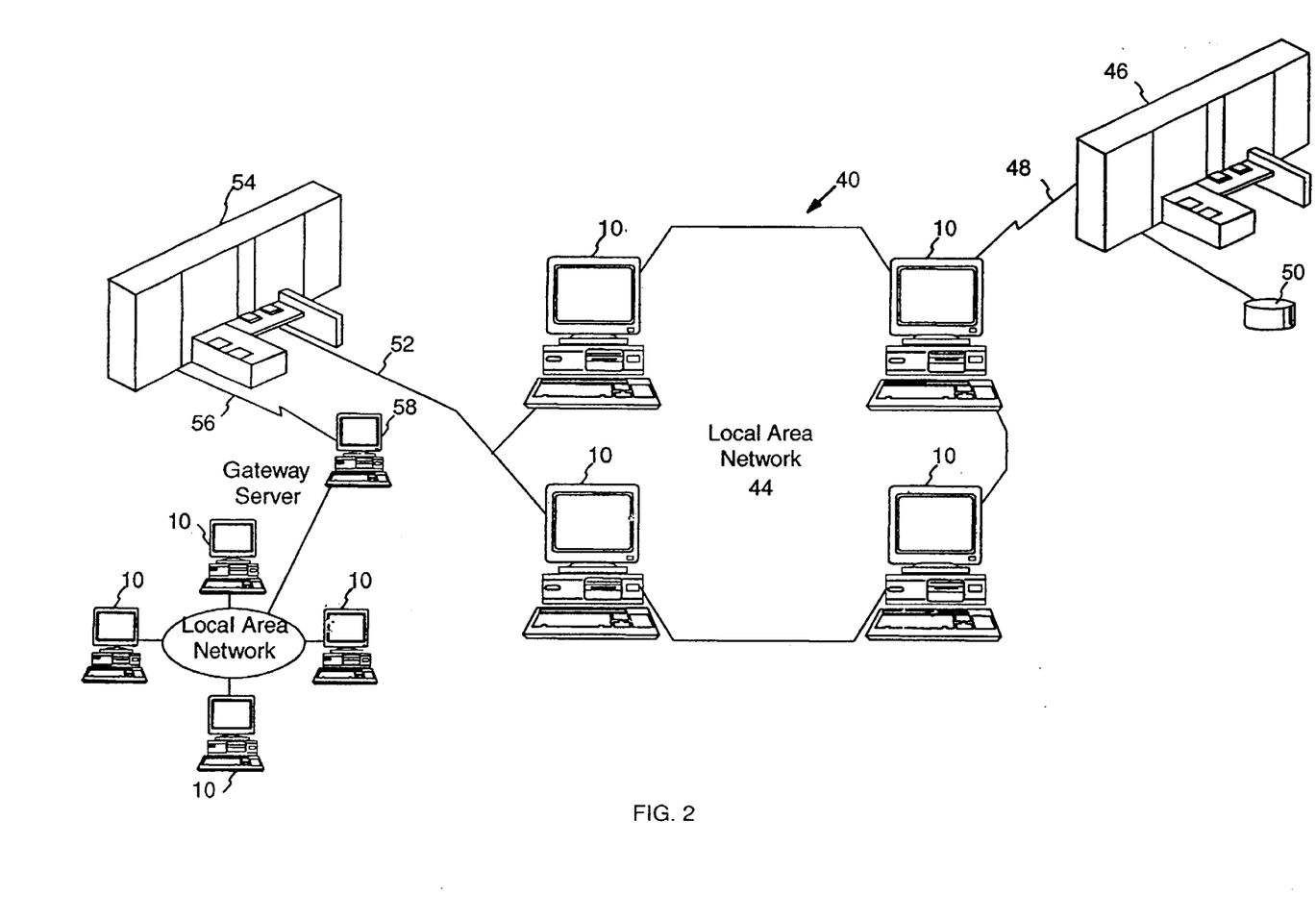
FIG. 2 is a diagram of a networked computing environment in which the present invention may be practiced.

FIG. 2 illustrates a data processing network 40 in which the present invention may be practiced. The data processing network 40 includes a plurality of individual networks, including LANs 42 and 44, each of which includes a plurality of individual workstations 10. Alternatively, as those skilled in the art will appreciate, a LAN may comprise a plurality of intelligent workstations coupled to a host processor.

Still referring to FIG. 2, the data processing network 40 may also include multiple mainframe computers, such as a mainframe computer 46, which may be preferably coupled to the LAN 44 by means of a communications link 48. The mainframe computer 46 may be implemented utilizing an Enterprise Systems Architecture/370, or an Enterprise Systems Architecture/390 computer available from the International Business Machines Corporation (IBM). Depending on the application, a midrange computer, such as an Application System/400 (also known as an AS/400) may be employed. "Enterprise Systems Architecture/370" is a trademark of IBM; "Enterprise Systems Architecture/390", "Application System/400" and "AS/400" are registered trademarks of IBM.

The mainframe computer 46 may also be coupled to a storage device 50, which may serve as remote storage for the LAN 44. Similarly, the LAN 44 may be coupled to a communications link 52 through a subsystem control unit/communication controller 54 and a communications link 56 to a gateway server 58. The gateway server 58 is preferably an individual computer or intelligent workstation which serves to link the LAN 42 to the LAN 44.

Those skilled in the art will appreciate that the mainframe computer 46 may be located a great geographic distance from the LAN 44, and similarly, the LAN 44 may be located a substantial distance from the LAN 42. For example, the LAN 42 may be located in California, while the LAN 44 may be located in Texas, and the mainframe computer 46 may be located in New York.

Software programming code which embodies the present invention is typically stored in permanent storage of some type, such as the permanent storage 30 of the workstation 10. In a client/server environment, such software programming code may be stored with storage associated with a server. The software programming code may be embodied on any of a variety of known media for use with a data processing system, such as a diskette, or hard drive, or CD-ROM. The code may be distributed on such media, or may be distributed to users from the memory or storage of one computer system over a network of some type to other computer systems for use by users of such other systems. The techniques and methods for embodying software program code on physical media and/or distributing software code via networks are well known and will not be further discussed herein.

A preferred embodiment of the present invention will now be discussed with reference to FIGS. 3(A–F) through 4.

Figure 3A:
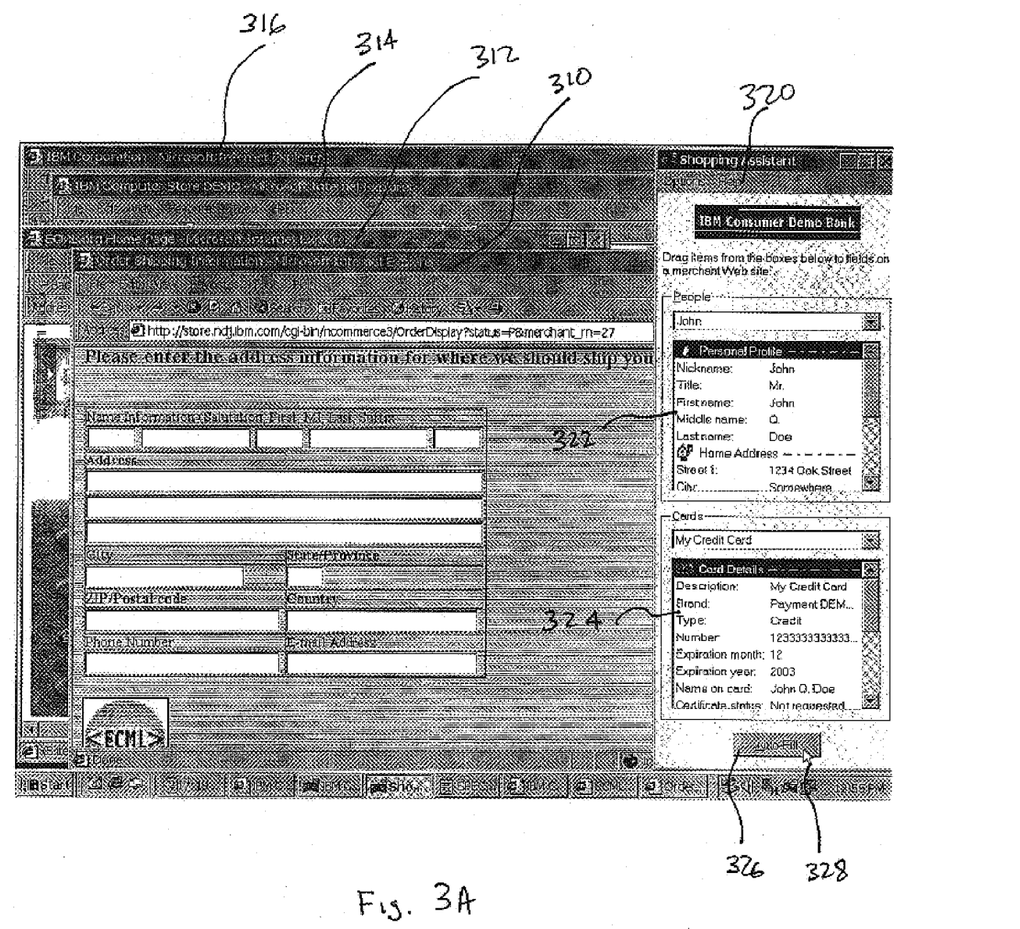
FIG. 3A–3F are screen-captures illustrating the operation of the present invention in an electronic commerce environment.

FIG. 3A depicts a "screen capture" of the computer screen of a typical computer user engaging in electronic commerce.

As can be seen in FIG. 3A, four browser windows 310, 312, 314, and 316 are illustrated, overlapping each other in a "messy desk" type of display.

An additional digital-wallet window 320 appears to be a prior art digital wallet displaying personal data 322 and credit card data 324. Instructions within window 320 instruct the user to drag items from the personal information box 322 or credit card box 324 to the appropriate locations on a merchant website.

An "auto-fill" button 326 is shown at the bottom of digital-wallet window 320, with a mouse pointer 328 located thereon. Under the prior art methods that include an auto-fill feature, depending on which prior art method is used, activating the auto-fill button 326 could perform one of the following actions, none of which are optimal: fill in the first window found; fill in the first window found that contains a form; fill in the last active window; or fill in all windows.

Figure 3B:
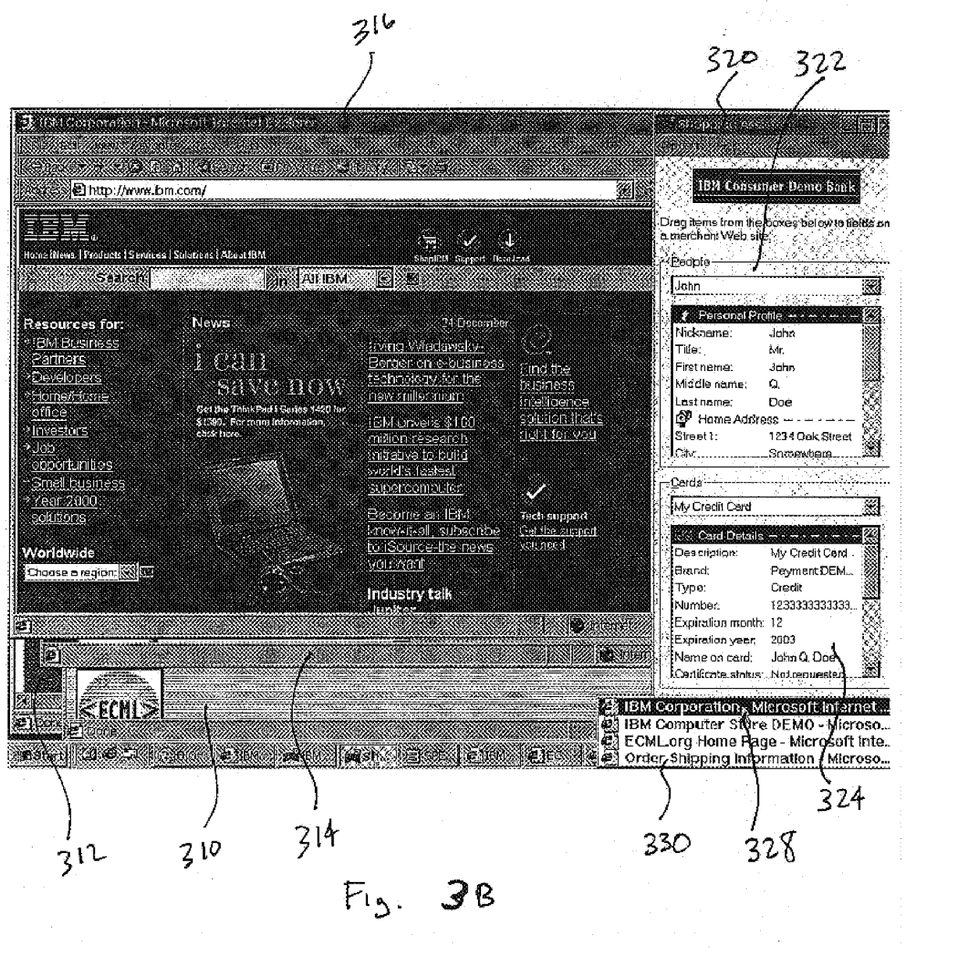

FIG. 3B depicts a screen capture of the screen depicted in FIG. 3A after the auto-fill button 326 has been pressed. As can be seen in FIG. 3B, in accordance with the present invention, an auto-fill selection window 330 is opened. Auto-fill selection window 330 contains a listing of selectable elements representing all open windows (other than the digital-wallet window 320 and the auto-fill selection window itself). Further, the mouse pointer 328 is positioned on the first selectable element within the window ("IBM Corporation—Microsoft Internet Explorer"). As can be seen in FIG. 3B, with the first item highlighted, the highlighted window 316 is moved to the top of the desktop so that it is in plain view, overlaid on the other three open windows.

Figure 3C:
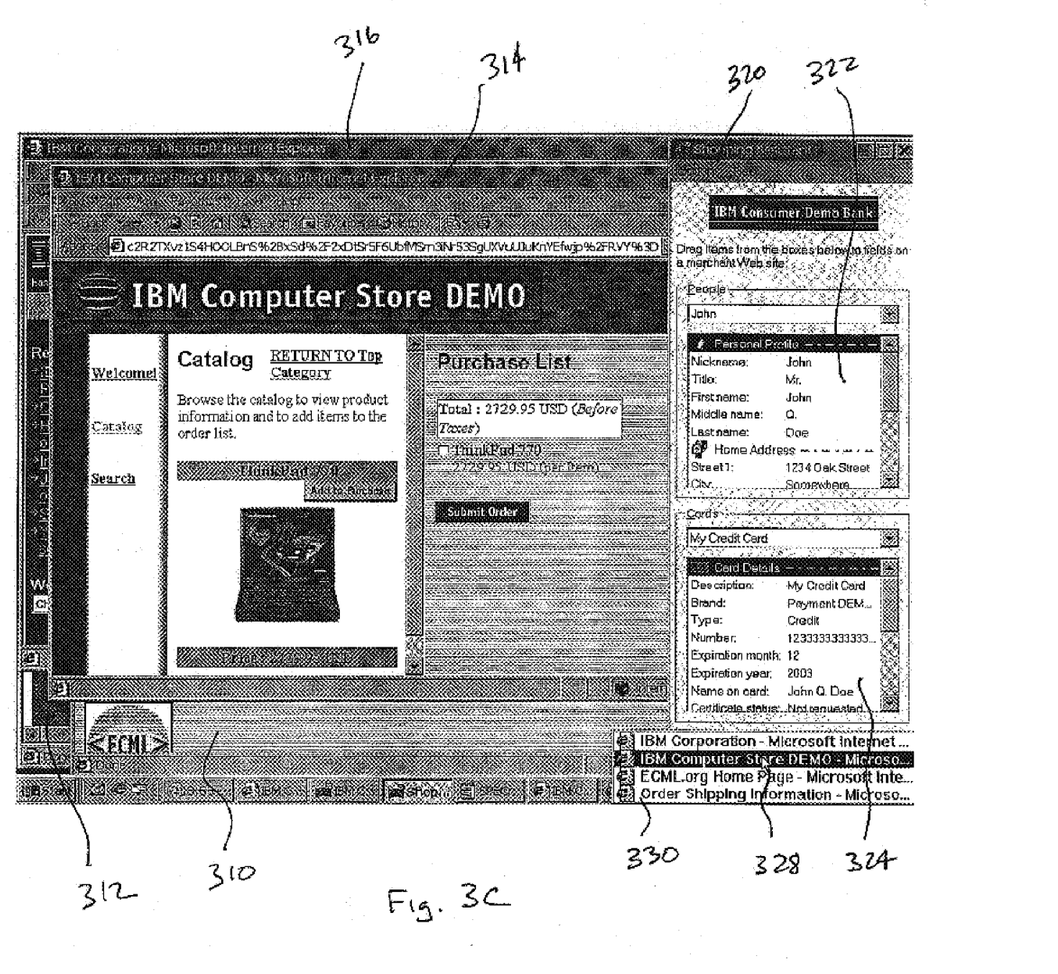
Figure 3D:
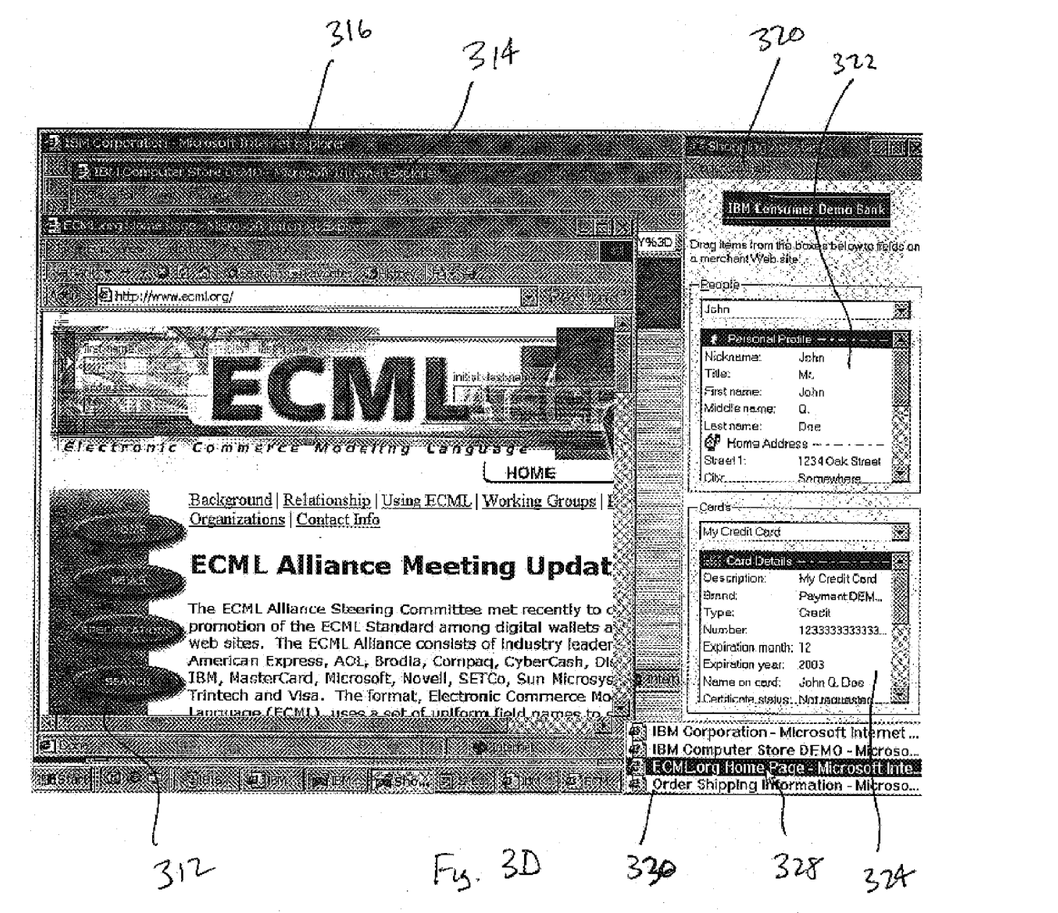
Figure 3E:
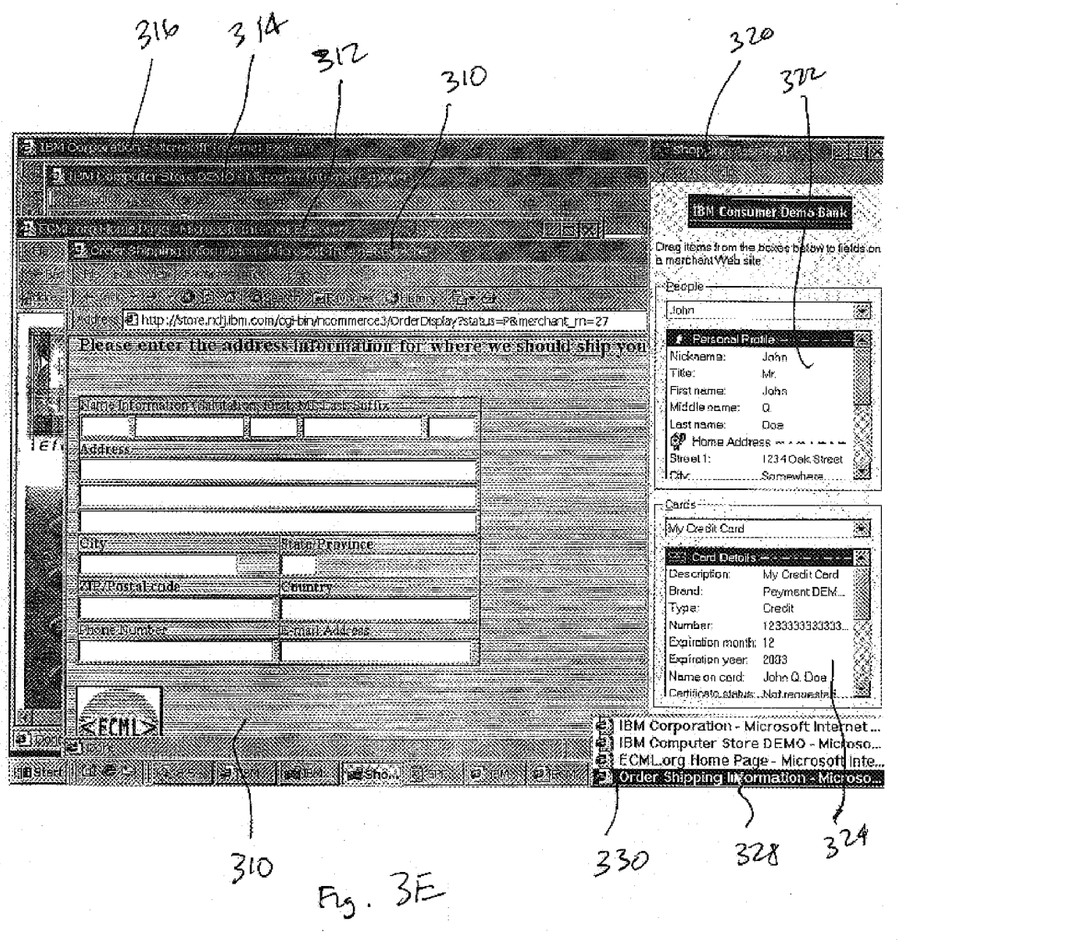

FIG. 3C depicts a screen capture showing the screen of FIG. 3B after the mouse pointer 328 has been positioned on the second item ("IBM Computer Store Demo—Microsoft Internet Explorere") within the list in auto-fill window 330. As can be seen, window 314 corresponding to the second item on the list is now moved to the top of the desktop. FIGS. 3D and 3E similarly illustrate what happens when the mouse pointer 328 is moved to the third and fourth items, respectively, in the auto-fill selection window 330. In FIG. 3D, window 312, corresponding to the third item on the list ("ECML.org Home Page—Microsoft Internet Explorer") is moved to the front, and in FIG. 3E, window 310, corresponding to the fourth item in the auto-fill selection window ("Order Shipping Information—Microsoft Internet Explorer"), is brought to the front.

Figure 3F:
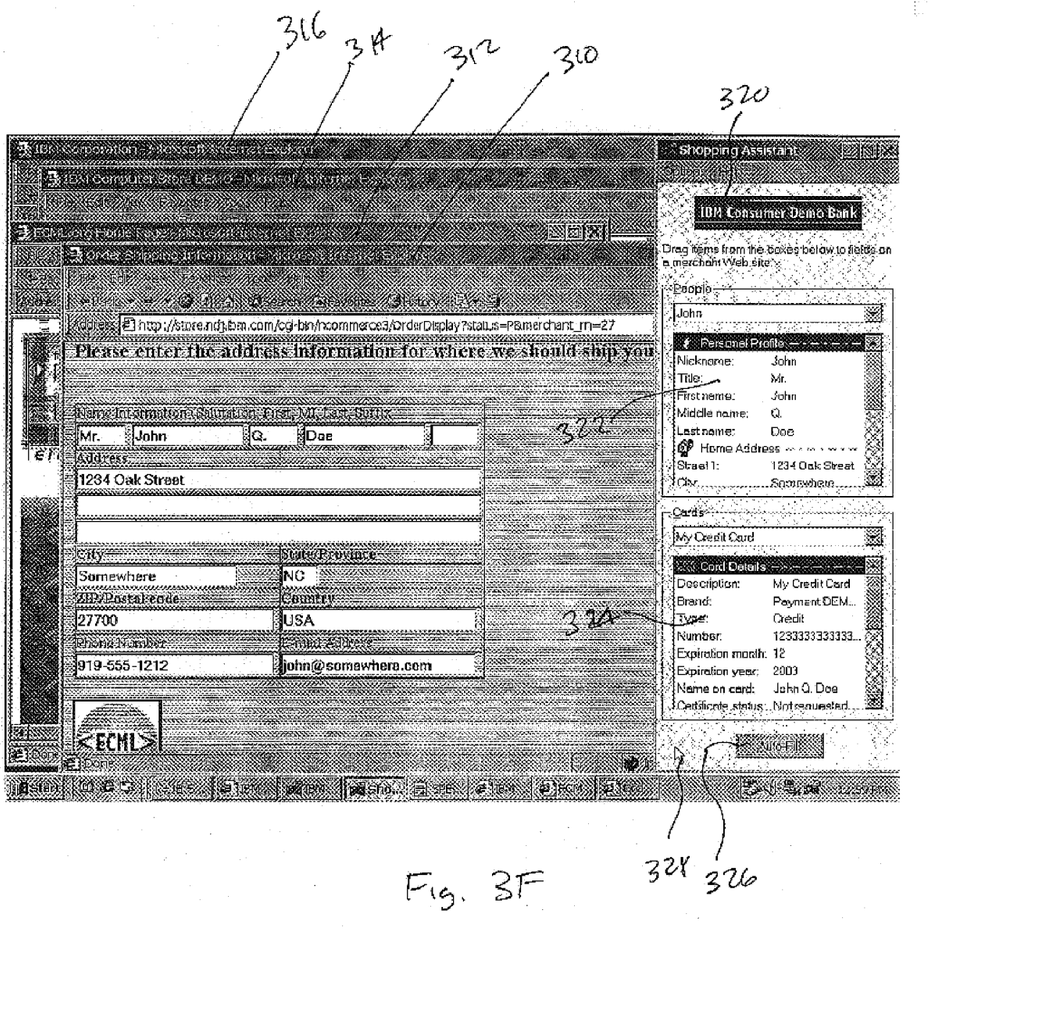

Window 314, displayed in front as shown in FIG. 3E, contains a form which requests that the user input address information relating to shipping of a proposed purchase. In accordance with the present invention, with the mouse pointer 328 positioned on the fourth item in the auto-fill selection window, corresponding to window 314, the user can single-click the left mouse button and the appropriate information from the digital wallet 320 is automatically transferred to the appropriate field in window 314 only. A window completed in this manner is illustrated in FIG. 3F.

While the above explanation describes the use of a mouse pointer for the selection process, in a well known manner the user can also opt to use the arrow keys of the keyboard to change the selection in the auto-fill selection window 330 and use the "ENTER" key to cause the highlighted window to be filled in with the wallet information.

Using the present invention, a user can easily select from among multiple windows that are already open and displayed on the desktop. A list of the appropriate windows is displayed to the user. As the mouse cursor is moved over an item in the list, the item is automatically highlighted and the corresponding window is brought to the foreground (but not above the control program itself) so that the user can see the actual window to be selected. This avoids confusion resulting from possibly similar names for the items in the control list. For example, a person searching for a particular item from different vendors might have multiple windows opened containing similar or identical captions. By using the present invention, the item highlighted in the control window, which will be where the wallet data will be directed, will bring to the desktop the corresponding window.

Figure 4:
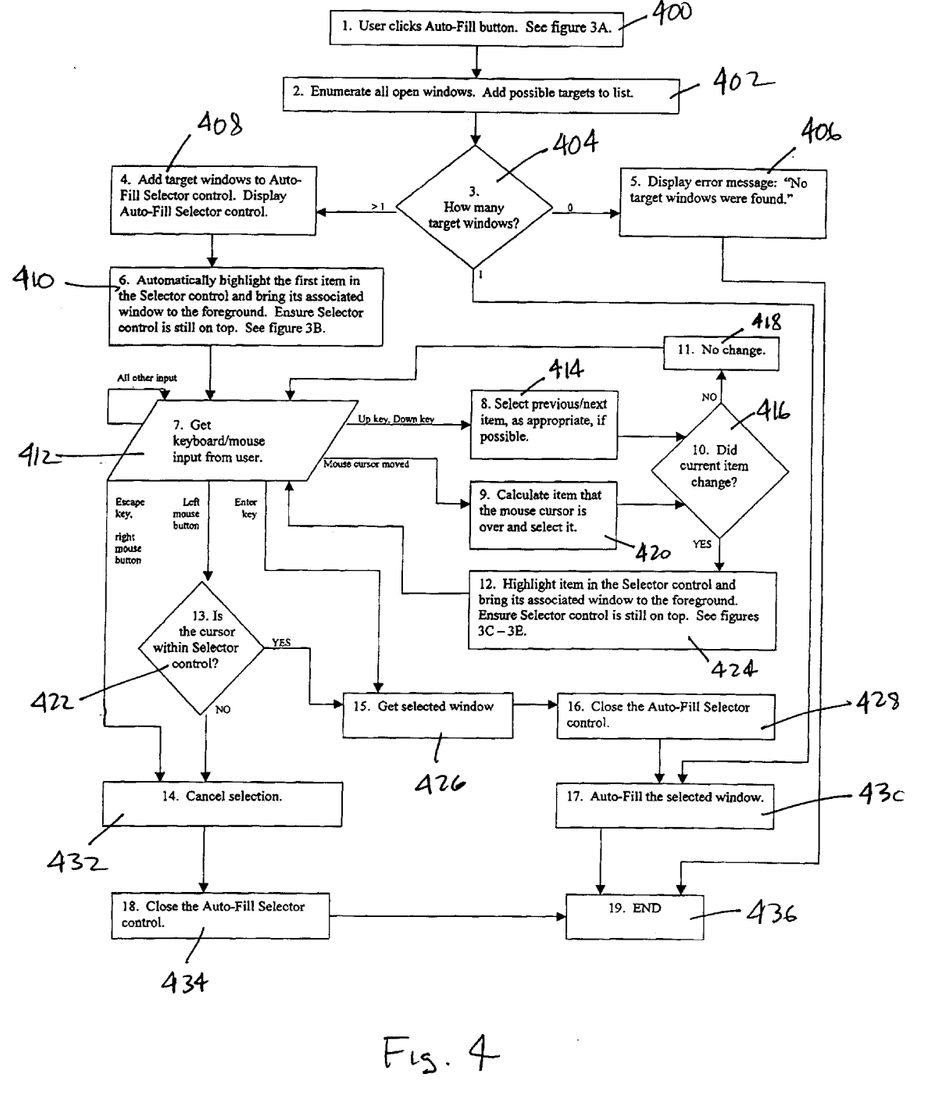
FIG. 4 is a flowchart illustrating an example of logical steps implemented to carry out the present invention.

FIG. 4 is a flowchart illustrating an example of programming steps which are implemented to carry out the present invention. As shown in FIG. 4, at step 400, a user activates the auto-fill selection process by clicking on the auto-fill button 326 of FIG. 3A. This causes the operating system at step 402 to enumerate all open windows for identification purposes in a known manner (e.g., by assigning each window a "handle" and by repeatedly running a "callback" program for each open window, with one of the parameters being passed to the callback function being the window handle). Each of the enumerated windows is then checked to determine if it is a possible target window for the auto-fill operation. This determination is made in a known manner and is application specific (e.g., Internet Explorer windows include a documented COM API to explicitly enumerate the windows created by Internet Explorer). If the window is a possible target for the auto-fill operation, it is added to a list in which all possible target windows are identified. The window handle for the target window is also stored in the list so that the window may be manipulated.

At step 404, the number of target windows T in the previously described list is checked. If there are no target windows found (i.e., T=0), then, at block 406, an error message is generated indicating the lack of any target windows and the process terminates at step 436. If only a single target window is found (i.e., T=1) no user intervention is necessary and the process proceeds directly to block 430 where the single window is automatically filled in and then the process terminates at step 436.

If at step 404, however, it is determined that there is more than one target window in the list (e.g. T>1) at step 408 the list of target windows are displayed in the auto-fill selection window. At step 410, one of the items displayed in the selection control window is automatically highlighted by default and its associated window is brought to the foreground. For example, since we know the window handle for each window in the list, documented Windows API functions exist which bring the window, specified by the window handle, to the foreground.

As an example, by default, at block 410 the first item in the selection control list would be highlighted and the associated box would be brought to the foreground. In a known manner, the digital-wallet window and auto-fill selection window are set to remain "on top", i.e., the digital-wallet and auto-fill selection windows will be in front of the highlighted window brought to the foreground.

At step 412, input from the user is processed. In a preferred embodiment, input is limited to receipt of signals from the up/down keys (block 414), mouse cursor movement (block 420), left mouse button (block 422), the "escape" key (block 432), right mouse button (also block 432), and the "enter" key (block 426). Input from any other keys, at least in the preferred embodiment, is ignored.

If, at step 412, manipulation of the up key or the down key is detected, then at block 414, the previous (up key) or next (down key) item will be highlighted, as appropriate.

Similarly, if mouse cursor movement is detected, at step 420 a calculation is made in a known manner to determine the item that the mouse cursor is over and it is selected. At step 416, a determination is made as to whether or not the "current item" (i.e., the highlighted item) has changed. If no change is detected, at block 418, the process returns back to block 412 for further action. If, at block 416, however, the current item did change, then at block 424, the new item is highlighted in the selector control window and its associated window is brought to the foreground, again making sure that the digital-wallet and auto-fill selection windows remain on top. The process then returns to block 412 for further processing. Once the desired item is highlighted, depressing one of the escape key, right mouse button, left button, or enter keys will result in the "processing" of the selection made by the user. Thus, if the escape key or the right mouse button is depressed, at step 432 the selection is canceled, the process proceeds to step 434 where the auto-fill selector window is closed and the process terminates at step 436. If the left mouse button is depressed, the process proceeds to step 422. At step 422, if the cursor is not within the selector control window, this is read as being a depression of the left mouse button for a reason other than auto-fill selection; the auto-fill selection process is canceled at step 432; the auto-fill selector window is closed at step 434; and the process terminates at step 436. If, on the other hand, at step 422 the cursor is within the selector control window, the process proceeds to step 426 where the selected window is retrieved, at step 428 the auto-fill selector control is closed, at step 430 the selected window is auto-filled, and then at step 436 the process terminates. Finally, if at step 412 the enter key is depressed, the process proceeds directly to step 426 and then to step 428 and 430 as previously described.

The precise programming steps required to carry out the processes described in FIG. 4 can be implemented in a variety of computer programs. Those of ordinary skill in the computer programming art can easily prepare such programs based on the steps explained with respect to FIG. 4.

Use of the present invention greatly enhances the ease with which a user can complete merchant web forms. In contrast to the "drag-and-drop" and auto-fill methods of the prior art which are time-consuming and/or error-prone when used, the present invention reduces the number of drag-and-drop operations that must be performed and assures that only the window selected by the user is automatically filled in with the desired information. Users may still use the old drag-and-drop methods, but they have the option of using the "smart" auto-fill feature of the present invention as an alternative.

While there has been described herein the principles of the invention, it is to be understood by those skilled in the art that this description is made only by way of example and not as a limitation to the scope of the invention. For example, while the present inventio is described above in connection with selecting a window from among plural windows and automatically filling the selected window with data, it is understood that the present invention functions equally well to select a window from among plural windows so that any function, such as automatically closing the window, or automatically sending an email message contained in the window, can be performed. Accordingly, it is intended by the appended claims, to cover all modifications of the invention which fall within the true spirit and scope of the invention.

We claim:

1. A computer-implemented method of automatically inserting data into at least one window displayed in a graphical user interface (GUI) in a desktop configuration, comprising the steps of:

providing a list of selectable elements, each of said selectable elements in said list associated with a respective window presently opened in said GUI;

designating one of said opened windows for viewing by highlighting one of said selectable elements in said list;

automatically moving said designated open window to the top of the desktop when said one of said selectable elements highlighted; and automatically inserting said data into said designated open window when said one of said selectable elements is selected.

2. The method as set forth in claim 1, wherein said data to be inserted is inserted to said designated window from a digital wallet.

3. The method as set forth in claim 2, further comprising the step of:

providing a data storage window which displays said data to be inserted.

4. The method as set forth in claim 3, wherein said designation step is accomplished using an input device, and wherein said insertion step is accomplished by manipulation of a selector on said input device.

5. The method as set forth in claim 4, wherein said input device comprises a pointing device.

6. The method as set forth in claim 4, wherein said input device comprises a keyboard.

* * * * *